United States Patent [19]

Sugo et al.

[11] Patent Number: 5,071,880

[45] Date of Patent: Dec. 10, 1991

[54] PROCESS FOR PRODUCING A BIFUNCTIONAL FILTER MEMBRANE HAVING IMINODIACETIC ACID GROUPS

[75] Inventors: Takanobu Sugo; Jiro Okamoto, both of Gunma; Kyoichi Saito, Tokyo, all of Japan

[73] Assignee: Japan Atomic Energy Research Institute, Japan

[21] Appl. No.: 437,659

[22] Filed: Nov. 17, 1989

[30] Foreign Application Priority Data

Jan. 13, 1989 [JP] Japan .................................. 64-7127

[51] Int. Cl.$^5$ .......................... C08J 5/20; C08J 5/22; C08L 23/26; C08L 23/36

[52] U.S. Cl. ...................................... 521/27; 210/490; 210/500.1; 210/500.21; 210/500.41; 427/244; 428/304.4; 428/305.5; 521/25; 521/38; 525/240

[58] Field of Search .......................... 521/27, 25, 38; 210/490, 500.1; 427/244; 428/304.4; 525/240

[56] References Cited

U.S. PATENT DOCUMENTS

| | | | |
|---|---|---|---|
| 4,242,185 | 12/1980 | McRae | 204/98 |
| 4,257,938 | 3/1981 | Hosoi et al. | 260/112 |
| 4,563,388 | 1/1986 | Bonk et al. | 428/304.4 |

FOREIGN PATENT DOCUMENTS 8194925 11/1983 Japan .

OTHER PUBLICATIONS

Porath, J. et al, "Metal Chelate Affinity Chromatography, A New Approach to Protein Fractionation", Nature, vol. 258, Dec. 18, 1975, pp. 598–599.

*Primary Examiner*—Joseph L. Schofer
*Assistant Examiner*—Fred Zitomer
*Attorney, Agent, or Firm*—Banner, Birch, McKie & Beckett

[57] ABSTRACT

A process for producing a filter membrane capable of simultaneous removal of metallic ions and nonionic materials from process water used in electronics industry, medical field, pharmaceutical industry and nuclear power generation.

The membrane is produced by introducing iminodiacetic acid groups to a porous membrane made from polyolefin or a copolymer of an olefin and a halogenated olefin by uv or ionizing radiation initiated graft polymerization.

8 Claims, No Drawings

PROCESS FOR PRODUCING A BIFUNCTIONAL FILTER MEMBRANE HAVING IMINODIACETIC ACID GROUPS

BACKGROUND OF THE INVENTION

1. Field of the Invention

The present invention relates to a useful and novel bifunctional filter membrane capable of simultaneous removal of metallic ions and nonionic materials from process water used in such applications as precision electronics industry, medical field, pharmaceutical industry and nuclear power generation.

2. Prior Art

Conventional methods of water treatment consist of first removing nonionic fine particles and microorganisms cells with micro filters or by cake filtration, then removing dissolved metallic ions with ion-exchange resins. These practices, however, involve complicated procedures and need a large volume of ion-exchange resins. Further, ion-exchange resins are fairly short-lived and present problems associated with the disposal of spent resins. Investigation has been undertaken to introduce ion-exchange groups into micro filter membranes but it has been difficult to completely solve the problems mentioned above on account of the drop in the ability to trap ions in the range of lower concentrations.

SUMMARY OF THE INVENTION

An object, therefore, of the present invention is to provide a bifunctional filter membrane that is prepared by introducing chelate-forming iminodiacetic acid groups into a porous micro filter membrane capable of removing nonionic fine particles and which has the added capability of removing dissolved trace ions of heavy metals such as cobalt, nickel and copper by trapping through adsorption.

In accordance with the present invention, ionizing radiation is allowed to act on a porous micro filter membrane based on an olefinic or halogenated olefinic polymer or copolymer, thereby grafting an epoxy-containing polymerizable monomer onto the polymer or copolymer base, and then iminodiacetic acid groups are securely attached to side chains in the graft polymer. The resulting membrane is capable of efficient removal of heavy metal components present in trace amounts in aqueous solutions and remains stable both chemically and physically.

DETAILED DESCRIPTION OF THE INVENTION

The base or substrate onto which polymerizable monomers are to be grated are selected from among polyethylene, polypropylene, polysulfone, polytetrafluoroethylene, and homo- and copolymers of ethylene, propylene, butene, hexene, tetrafluoroethylene and chlorotrifluoroethylene. The substrate can exhibit the form of a flat membrane or hollow fibers and can have an average pore size of 0.01-10 $\mu$m.

Polymerizable monomers which are to be grafted onto membranes made of such bases include, for example, glycidyl methacrylate, glycidyl acrylate, glycidyl sorbate, glycidyl metaitaconate, ethylglycidyl maleate and glycidyl divinyl sulfonate. While any polymerizable monomers may be used as long as they contain epoxy groups, glycidyl methacrylate and glycidyl acrylate are particularly preferred.

Ionizing radiations that are to be used in performing graft polymerization in accordance with the present invention may be selected from among $\alpha$-rays, $\beta$-rays, $\gamma$-rays, accelerated electron beams, X-rays and ultraviolet rays, and accelerated electron beams and $\gamma$-rays are preferred in practical applications.

To graft polymerizable monomers onto the substrate, radiation may be applied to the substrate and monomers simultaneously, or alternatively, the monomers may be brought into contact with the substrate after it has been irradiated. The latter method (pre-irradiation) is preferred since it is less likely to cause side reactions in addition to the intended graft polymerization.

Contact between the substrate and the monomers to be grafted may be effected in liquid phase by bringing liquid monomers or monomeric solutions into direct contact with the substrate or in vapor phase by bringing the vapor of monomers or vaporized monomers into contact with the substrate. Either method may be selected as appropriate for the specific purpose of using the resulting membrane.

The following examples are provided for the purpose of further illustrating the constitution and advantages of the present invention but are in no way to be taken as limiting.

EXAMPLE 1

Porous polyethylene hollow fibers (i.d.: 0.62 mm; o.d.: 1.24 mm; average pore size: 0.1 $\mu$m) were exposed to 200 kGy of accelerated electron beams (accelerating voltage: 2 MeV; beam current: 1 mA) in a nitrogen atmosphere. Thereafter, the fibers were subjected to vapor-phase graft polymerization by being brought into contact with the vapor of glycidyl methacrylate in vacuum at 40° C. for 6 hours. The resulting increase in the fiber weight was 130%. The graft membrane was immersed in an aqueous solution of sodium iminodiacetate (0.4 mol/l) preadjusted to a pH of 12 with sodium carbonate and reaction was performed at 80° C. for 24 hours to prepare a bifunctional filter membrane having 2 mmol of chelate-forming iminodiacetic acid groups per gram of the substrate. Iminodiacetic acid groups can be present in an amount of 0.1-8 mmol per gram of membrane weight, however. This hollow fiber membrane was subjected to a metal trapping water permeation test which consisted of injecting an aqueous solution of cobalt chloride (1 ppm) into the hollow fibers at a pressure of 1 kg/cm$^2$ and allowing it to permeate through the membrane wall at a rate of 1 m$^3$/m$^2$h. The permeate from the membrane was fractionated in 50-ml portions and even the concentration of cobalt in the 10th fraction was no higher than 0.01 ppm. This obviously shows that the bifunctional filter membrane having iminodiacetic acid groups was highly capable of trapping cobalt ions.

EXAMPLE 2

A polyethylene substrate in a porous flat membrane form (thickness: 100 $\mu$m; average pore size: 0.1 $\mu$m) was treated as in Example 1 to have glycidyl methacrylate grafted, thereby producing a membrane with a graft ratio of 100%. Iminodiacetic acid groups were securely attached to this membrane as in Example 1 to fabricate a bifunctional filter membrane containing 1.5 mmol of iminodiacetic acid groups per gram of the substrate. An aqueous solution of cupric sulfate (1 ppm) was permeated through the resulting flat membrane. The concentration of copper in the permeate was only 0.02 ppm even after 2 hours of the treatment, showing that the membrane was highly effective in adsorbing copper ions.

EXAMPLE 3

A polypropylene substrate in a porous membrane form (thickness: 100 μm; average pore size: 0.1 μm) was subjected to graft polymerization and had iminodiacetic acid groups attached securely as in Example 1. As a result, a bifunctional filter membrane with a graft ratio of 110% that contained 1.5 mmol of iminodiacetic acid groups per gram of the substrate was fabricated. A liter of an aqueous solution of nickel chloride (1 ppm) was permeated through the resulting flat membrane. The concentration of nickel in the permeate was no higher than 0.02 ppm, showing that the membrane was highly effective in adsorbing nickel ions.

In accordance with the present invention, bifunctional filter membranes were obtained and they were capable of filtering off nonionic fine particles while exhibiting high effectiveness in adsorbing heavy metal ions present in trace amounts in aqueous solutions.

What is claimed is:

1. A process for producing a bifunctional filter membrane, said process comprising the steps:
    grafting an epoxy-containing polymerizable monomer selected from the group consisting of:
        glycidyl methacrylate;
        glycidyl acrylate;
        glycidyl sorbate;
        glycidyl metaitaconate;
        ethylglycidyl maleate; and
        glycidyl divinyl sulfonate
    onto a porous membrane substrate which comprises
        polyethylene;
        polypropylene;
        polysulfone;
        polytetrafluoroethylene; or
        chlorotrifluoroethylene
    by exposing said substrate to ionizing radiation, and contacting the irradiated substrate with said monomer; and
    attaching iminodiacetic acid groups to the grafted substrate.

2. A process according to claim 1 wherein the grafting step comprises:
    grafting said monomer onto said porous membrane substrate by contacting the irradiated substrate with a vapor comprising said monomer.

3. A process according to claim 1 wherein the grafting step comprises:
    grafting glycidyl methacrylate or glycidyl acrylate onto a porous membrane substrate which comprises polyethylene or polypropylene.

4. A process according to claim 1 wherein the grafting step comprises:
    exposing said substrate to ionizing radiation which comprises α-rays, β-rays, gamma rays, accelerated electron beams, X-rays, or ultraviolet rays.

5. A process according to claim 4 wherein the exposing step is performed in a nitrogen atmosphere.

6. A process according to claim 5 wherein the attaching step comprises:
    contacting said substrate with a vapor which comprises said monomer.

7. A process according to claim 1 wherein the attaching step comprises:
    contacting said substrate with a liquid which comprises said monomer.

8. A process for producing a bifunctional filter membrane, said process comprising:
    grafting an epoxy-containing polymerizable monomer onto a porous membrane substrate which comprises a polyolefin or a copolymer of an olefin and a halogenated olefin by exposing said substrate to ionizing radiation in the presence of said monomer; and
    attaching iminodiacetic acid groups to the grafted substrate.

* * * * *